(12) United States Patent
Chang et al.

(10) Patent No.: US 7,528,900 B2
(45) Date of Patent: May 5, 2009

(54) LIQUID CRYSTAL DISPLAY MODULE AND BACKLIGHT MODULE

(75) Inventors: Chih-Li Chang, Tao-Yuan Hsien (TW); Hung-Chen Kao, Tao-Yuan Hsien (TW); Wei-Chi Lin, Tao-Yuan Hsien (TW); Jia-Rung Juang, Tao-Yuan Hsien (TW)

(73) Assignee: Hannstar Display Corporation, Tao-Yuan Hsien (TW)

( * ) Notice: Subject to any disclaimer, the term of this patent is extended or adjusted under 35 U.S.C. 154(b) by 385 days.

(21) Appl. No.: 11/399,345

(22) Filed: Apr. 7, 2006

(65) Prior Publication Data

US 2007/0236634 A1    Oct. 11, 2007

(51) Int. Cl.
*G02F 1/1335* (2006.01)

(52) U.S. Cl. .................... 349/64; 349/62; 349/96

(58) Field of Classification Search .................. 349/56, 349/61, 62, 64, 96, 112
See application file for complete search history.

(56) References Cited

U.S. PATENT DOCUMENTS

2006/0109395 A1* 5/2006 Yamamoto et al. ............ 349/58

* cited by examiner

*Primary Examiner*—Frank G Font
*Assistant Examiner*—Michael P Mooney
(74) *Attorney, Agent, or Firm*—Rosenberg, Klein & Lee

(57) ABSTRACT

A liquid crystal display module with backlight module providing an enhancement coefficient of the brightness enhancement film (BEF) within the range of 0.1 to 0.5. The backlight module is disposed behind the display panel and comprises a bottom diffuser, a brightness enhancement film, and a top diffuser disposed on the brightness enhancement film. A set of polarizers is disposed above and below the liquid crystal display panel. The backlight module meets TCO standards and has improved optical performance.

19 Claims, 3 Drawing Sheets

LIQUID CRYSTAL DISPLAY MODULE AND BACKLIGHT MODULE

BACKGROUND OF THE INVENTION

1. Field of the Invention

The present invention relates to a liquid crystal display, and more particularly to a backlight module for a high-quality liquid crystal display module.

2. Description of the Related Art

Owing to advances in TFT-LCD (Thin-Film-Transistor Liquid Crystal Display) technology, the development of future generation large-size display panel is flourishing. TFT-LCD's are replacing traditional CRT (Cathode Ray Tube) displays, rear projection TV's and PDP's (plasma display panel) and are becoming the standard displays. Since a TFT-LCD has the advantages of providing a high-quality picture with high luminance and wide viewing angle, and having the flexibility of being applied to various-size devices, the LCD monitor has replaced the traditional CRT monitor. As LCD applications are so extensive, and as the amount of time that a user spends viewing the LCD is so long, it is necessary to establish a definite standard for LCD's.

TCO (the Swedish Confederation of Professional Employees) is a third party certification organization for LCD's. An LCD product satisfying TCO standards means that the LCD's quality has reached a substantially high level.

Under the "Two Trillion, Twin Stars" plan, Taiwan's TFT-LCD industry has ranked among the top three in the world. However, leadership in the LCD industry cannot just depend on the fast growth in production quantity but also requires persistent progress in product quality. Only via ceaseless research, leading technical development, and independent product design can a decisive position be achieved in the LCD industry.

Traditionally, the higher the LCD luminance, the better the product is. However, the TCO standard has a meaningful requirement that the luminance of a high quality LCD not only should be great but also should be uniform.

Therefore, there is need for a superior quality LCD with effective backlight module capable of meeting TCO's standard and with high optical performance.

SUMMARY OF THE INVENTION

To achieve these and other advantages and in order to overcome the disadvantages of the conventional method in accordance with the purpose of the invention as embodied and broadly described herein, the present invention provides a liquid crystal display module with backlight module, wherein the optical film of the backlight module is optimized to satisfy TCO's standard and has superior optical performance so that a high-quality LCD product can be fabricated.

To achieve the abovementioned objective, the present invention comprises a liquid crystal display module with backlight module, wherein the enhancement coefficient of the brightness enhancement film (BEF) is defined to be the ratio of BEF vertical output intensity to BEF 40-degree output intensity, the BEF enhancement coefficient is within the range of from 0.1 to 0.5, and the haze of the bottom diffuser is within the range of from 0 to 50%.

In an embodiment of the present invention, the backlight module further comprises a top diffuser, and the haze of the top diffuser is within the range of from 0 to 40% so that TCO standard can be satisfied. In another embodiment of the backlight module of the present invention, the brightness enhancement film is a Dual Brightness Enhancement Film (DBEF), the DBEF enhancement coefficient is within the range of from 0.3 to 0.5, and the haze of the bottom diffuser is within the range of from 65 to 80%. This allows the backlight module of the present invention to provide better optical performance.

The present invention also discloses an LCD module comprising an LCD panel and the abovementioned backlight module, which not only meets TCO's standard but also adopts polarizers to maintain the contrast of the panel, wherein the single transmittance of the polarizer is more than 42%, the parallel transmittance more than 35%, the cross transmittance less than 0.08%, and the polarizing efficiency more than 99%. As a result, the LCD module achieves a high-level of optical performance.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE INVENTION

Figure 1:
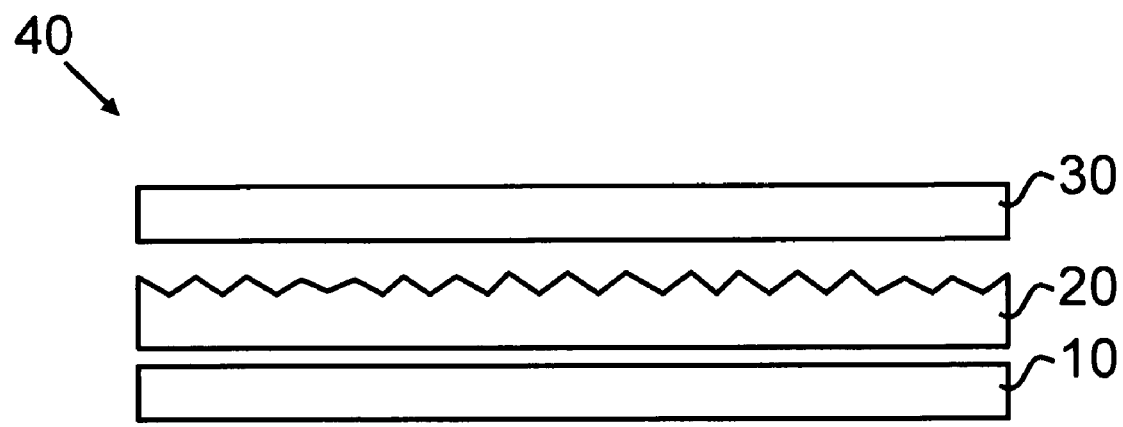
FIG. 1 is a drawing illustrating a backlight module according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1, which is a drawing illustrating a backlight module according to an embodiment of the present invention. As shown in FIG. 1, the backlight module 40 essentially comprises the following optical films: a bottom diffuser 10, a BEF 20 (Brightness Enhancement Film), and a top diffuser 30, wherein the brightness enhancement film 20 is disposed between the bottom diffuser 10 and the top diffuser 30. The arrangement of the optical films and the optical parameters thereof determine the performance of the output light.

Figure 2:
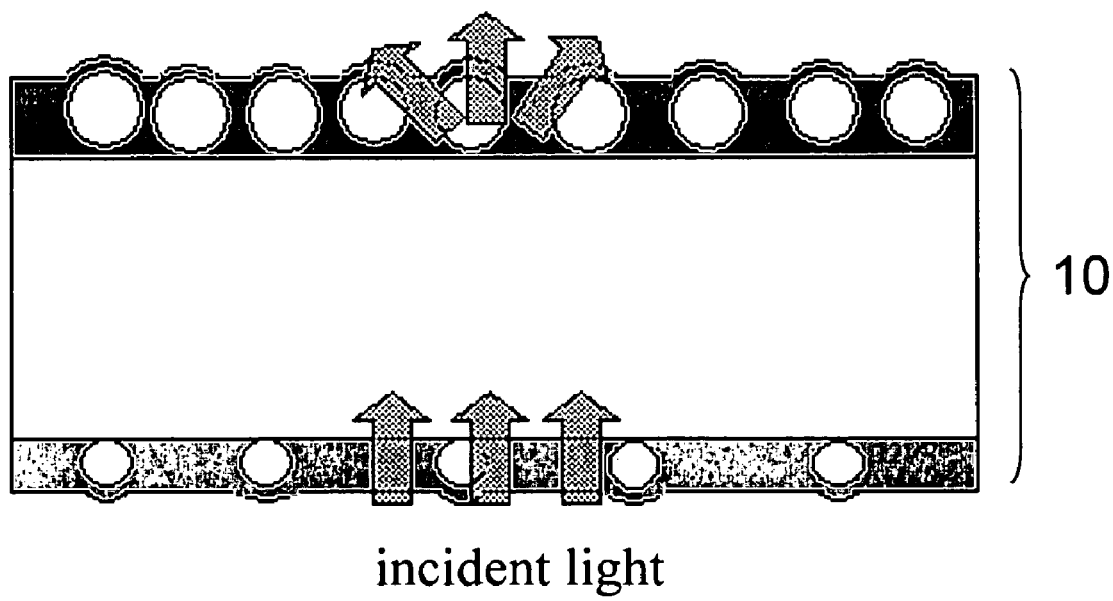
FIG. 2 is a drawing illustrating the light output of the diffuser according to an embodiment of the present invention.
Figure 3:
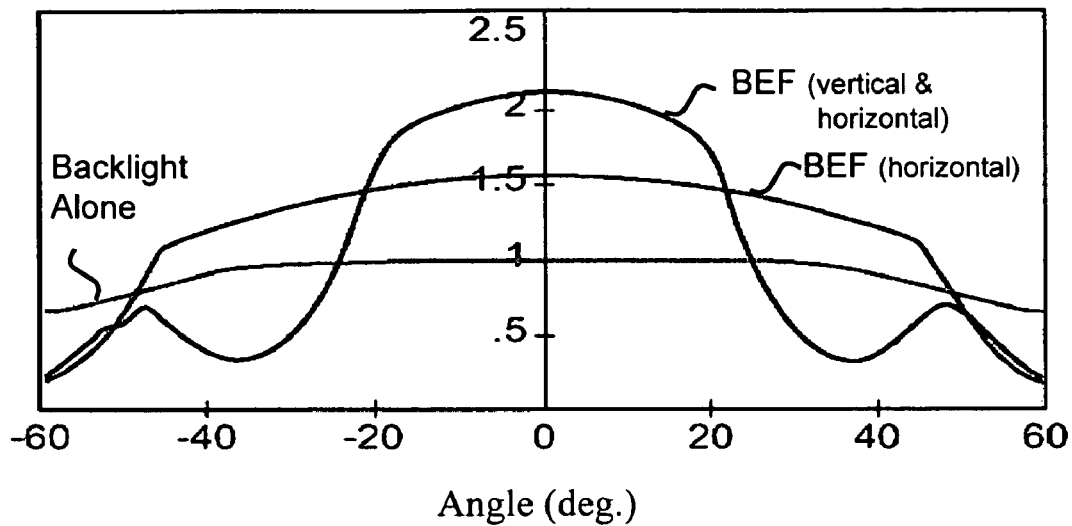
FIG. 3 is a diagram illustrating the output light distribution of the backlight module with and without brightness enhancement film according to an embodiment of the present invention.

Refer to FIG. 2, which is a drawing illustrating the light output of the diffuser according to an embodiment of the present invention, and to FIG. 3, which is a diagram illustrating the output light distribution of the backlight module without brightness enhancement film, with vertical and horizontal BEF, and with horizontal BEF according to an embodiment of the present invention. FIG. 2 and FIG. 3 show the characteristics of the output light of the diffusers and BEF.

Figure 4:
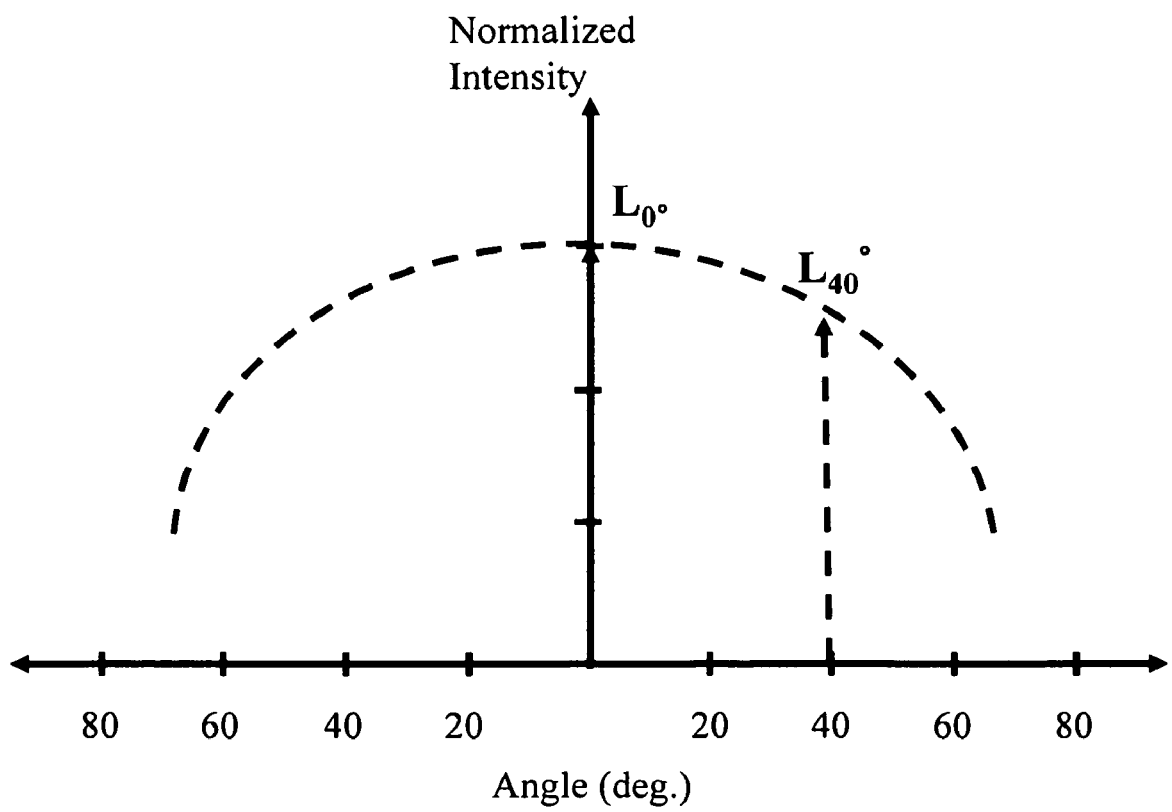
FIG. 4 is a diagram illustrating the definition of enhancement coefficient L according to an embodiment of the present invention.

Refer to FIG. 4, which is a diagram illustrating the definition of enhancement coefficient L according to an embodiment of the present invention.

The BEF light enhancement coefficient L is defined to be the ratio of BEF vertical output intensity $L_0°$ to BEF 40-degree output intensity $L_{40°}$, wherein the BEF vertical output intensity $L_0°$ is the output light intensity of BEF 20 in the direction normal to BEF 20, and BEF 40-degree output intensity $L_{40}°$ is the output light intensity of BEF 20 in the direction deviated from the normal of BEF 20 by 40 degrees. To meet TCO's standard, the BEF light enhancement coefficient L should be within the range of from 0.1 to 0.5, the haze of the top diffuser 30 should be within the range of from 0 to 40%, and the haze of the bottom diffuser 10 should be within the range of from 0 to 50%.

In an embodiment of the present invention, the haze of the top diffuser 30 is preferred to be within the range of from 10 to 40%, and the haze of the bottom diffuser 10 is preferred to be within the range of from 30 to 50%. Thereby, such a combination of optical films can easily satisfy TCO's standard, and better optical performance can also be obtained.

Figure 5:
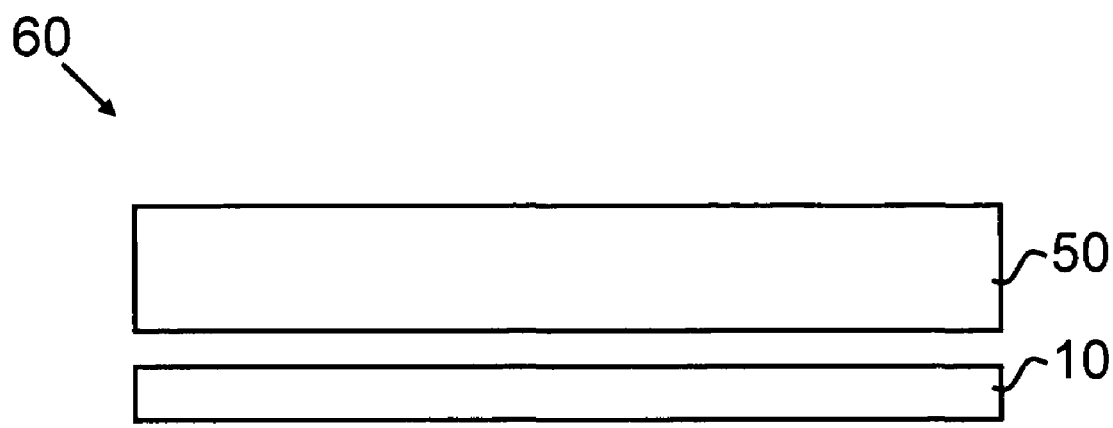
FIG. 5 is a drawing illustrating the backlight module according to an embodiment of the present invention.

Refer to FIG. 5, which is a drawing illustrating a backlight module according to an embodiment of the present invention. As shown in FIG. 5, the backlight module 60 comprises: a bottom diffuser 10 and a DBEF 50 (Dual Brightness Enhancement Film) positioned above the bottom diffuser 10, wherein the haze of the bottom diffuser 10 is within the range of from 65 to 80%, and the DBEF light enhancement coefficient L is within the range of from 0.3 to 0.5.

In addition to meeting TCO's standard, the present invention also achieves a higher optical performance for the panel. For example, when meeting the luminance requirement of TCO 03, the panel still maintains a high contrast.

Figure 6:
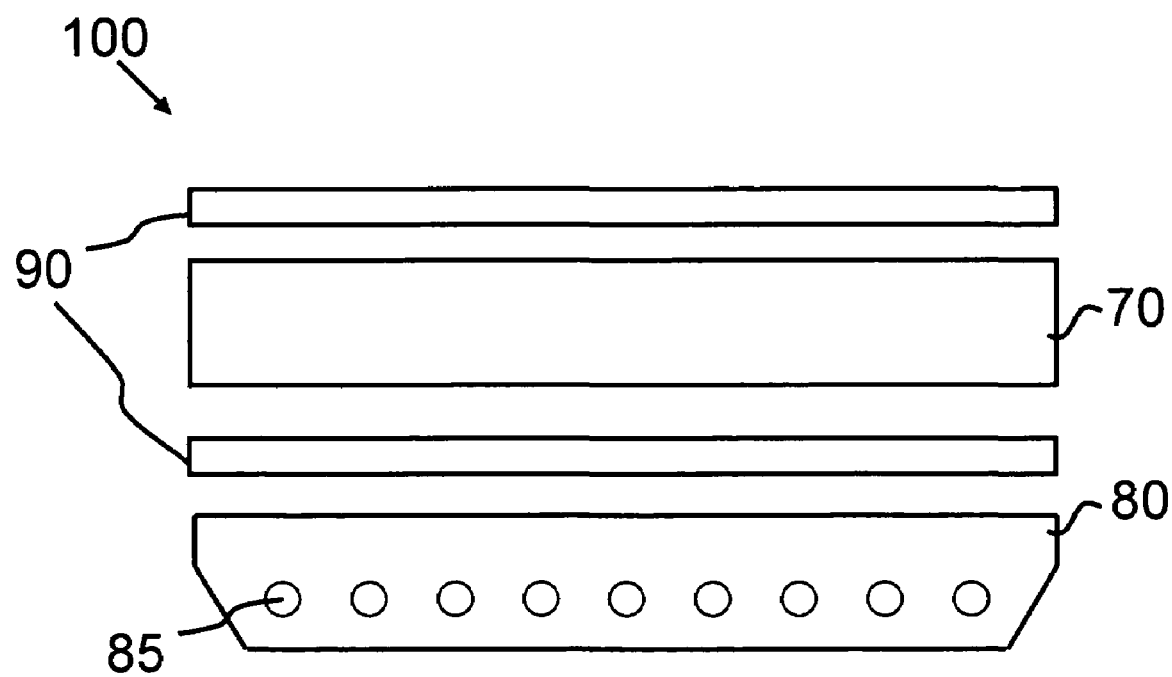
FIG. 6 is a drawing illustrating an LCD module according to an embodiment of the present invention.

Refer to FIG. 6, which is a drawing illustrating an LCD module according to an embodiment of the present invention. In the embodiment illustrated in FIG. 6, the LCD module 100 comprises the backlight module 80 described in the above-mentioned embodiments. The backlight module 80 with light sources 85 is installed in the rear side of an LCD panel 70, and polarizers 90 may be selectively adopted to cooperate with the architecture of the backlight module 80 so that TCO's standard can be satisfied without the losing contrast. The properties of concern for the polarizer 90 include: single transmittance, parallel transmittance, cross transmittance, and polarizing efficiency. In an embodiment of the present invention single transmittance is greater than 42%, parallel transmittance is greater than 35%, cross transmittance is less than 0.08%, and polarizing efficiency is greater than 99%. Such a combination can satisfy TCO's standard without the loss of contrast.

As to the test results of luminance, the maximum luminance of the backlight module of the abovementioned embodiments can reach more than 246 cd/m², which meets the TCO 99 requirement that the maximum luminance should be no less than 125 cd/m², and also meets the TCO 03 requirement that the maximum luminance should be higher than 150 cd/m².

As to the test results of luminance uniformity, the ratio of the maximum luminance and the minimum luminance of the backlight module of the present invention is 1.16, which meets the TCO 03 requirement that the luminance ratio should be lower than 1.5.

For the backlight module of the present invention, the ratio of the maximum luminance to the minimum luminance at ±30° with respect to the normal of the backlight module in the horizontal direction is 1.62, and the ratio of the maximum luminance to the minimum luminance at +15° with respect to the plane of the backlight module in the vertical direction is 1.08. Both of these meet the TCO 03 requirement that the ratio of the maximum luminance to the minimum luminance should be less than 1.7. Therefore, in the present invention, the difference between the central luminance and the side luminance of the screen is reduced, and the luminance uniformity is promoted.

As to the test results of luminance contrast, the contrast ratio (CR) of the backlight module of the present invention meets the standard's requirement that luminance contrast should be equal to or greater than 500. The angular dependence luminance contrast (Cm) of the backlight module of the present invention also meets the standard's requirement that luminance contrast should be higher than 0.8 at ±30° in the horizontal direction.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A backlight module, comprising:
   a bottom diffuser; and
   a brightness enhancement film disposed on the bottom diffuser, the brightness enhancement film being a Dual Brightness Enhancement Film and having an enhancement coefficient within a range of 0.1 to 0.5;
   wherein the enhancement coefficient is defined to be a ratio of vertical output intensity to 40-degree output intensity, the vertical output intensity is output light intensity of the brightness enhancement film in a direction normal to the brightness enhancement film, and the 40-degree output intensity is output light intensity of the brightness enhancement film in a direction deviated from normal of the brightness enhancement film by 40 degrees.

2. The backlight module according to claim 1, wherein the enhancement coefficient of the Dual Brightness Enhancement Film is within a range of 0.3 to 0.5.

3. The backlight module according to claim 1, wherein haze of the bottom diffuser is within a range of 65 to 80%.

4. The backlight module according to claim 1, further comprising a top diffuser disposed on the brightness enhancement film.

5. The backlight module according to claim 4, wherein haze of the top diffuser is within a range of 0to 40%.

6. The backlight module according to claim 5, wherein haze of the top diffuser is within a range of 10 to 40%.

7. The backlight module according to claim 4, wherein haze of the bottom diffuser is within a range of 0 to 50%.

8. The backlight module according to claim 7, wherein haze of the bottom diffuser is within a range of 30 to 50%.

9. A liquid crystal display module, comprising:
   a backlight module with a plurality of light sources, the backlight module comprising:
   a bottom diffuser; and
   a brightness enhancement film, disposed on the bottom diffuser with a enhancement coefficient within a range of 0.1 to 0.5, the brightness enhancement film being a Dual Brightness Enhancement Film, wherein the enhancement coefficient is defined to be a ratio of normal output light intensity to 40-degree output light intensity; and a liquid crystal display panel disposed on the backlight module.

10. The liquid crystal display module according to claim 9, wherein the enhancement coefficient of the Dual Brightness Enhancement Film is within a range of 0.3 to 0.5.

11. The liquid crystal display module according to claim 9, wherein haze of the bottom diffuser is within a range of 65 to 80%.

12. The liquid crystal display module according to claim 9, further comprising a set of polarizers disposed above and below the liquid crystal display panel.

13. The liquid crystal display module according to claim 12, wherein single transmittance of the set of polarizers is greater than 42%.

14. The liquid crystal display module according to claim 12, wherein parallel transmittance of the set of polarizers is greater than 35%.

15. The liquid crystal display module according to claim 12, wherein cross transmittance of the set of polarizers is lower than 0.08%.

16. The liquid crystal display module according to claim 12, wherein polarizing efficiency of the set of polarizers is greater than 99%.

17. The liquid crystal display module according to claim 9, further comprising a top diffuser disposed on the brightness enhancement film.

18. The liquid crystal display module according to claim 17, wherein haze of the top diffuser is within a range of 0 to 40%.

19. The liquid crystal display module according to claim 9, wherein haze of the bottom diffuser is within a range of 0 to 50%.

* * * * *